Figure 2:
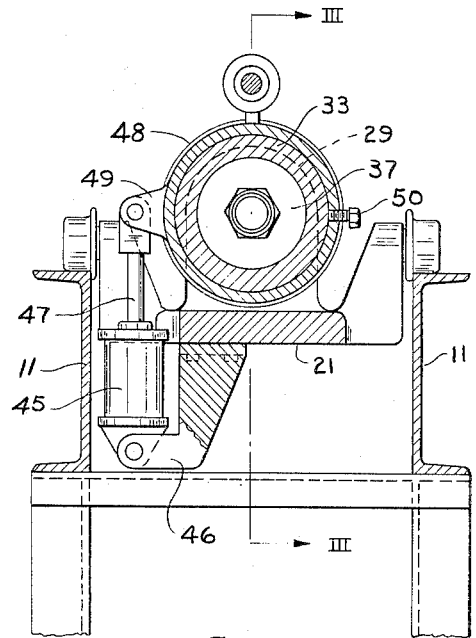

Aug. 16, 1955   M. A. GROSSU   2,715,431
COMBINED TENSIONING AND TWISTING APPARATUS
FOR STRAIGHTENING EXTRUDED SHAPES
Filed Oct. 24, 1952   2 Sheets-Sheet 1
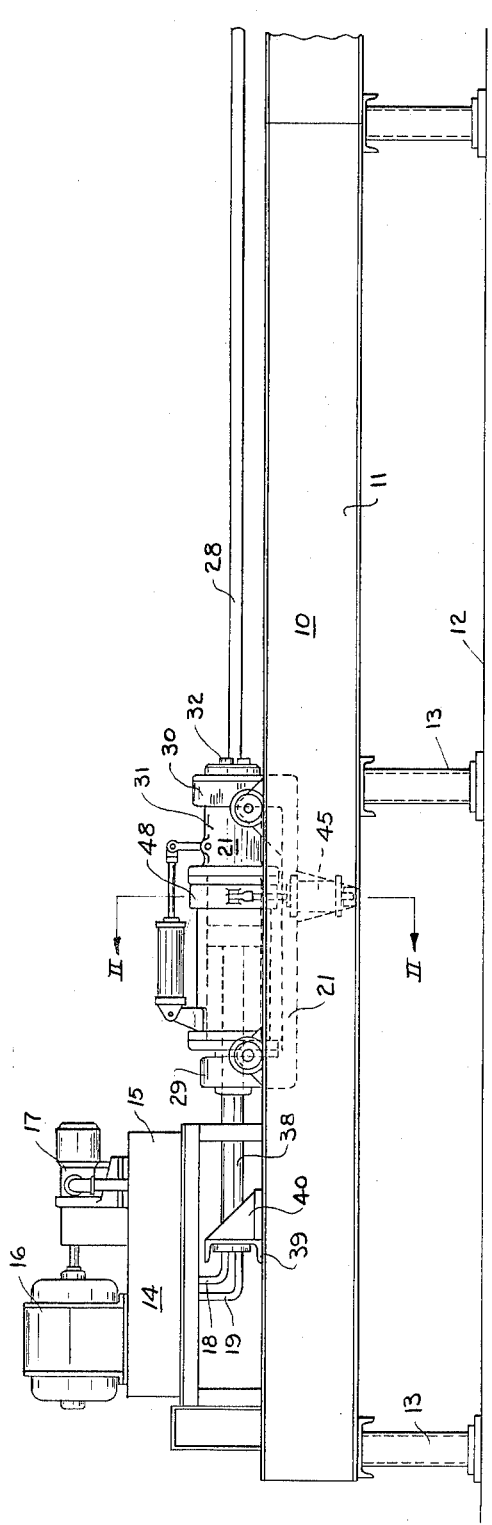
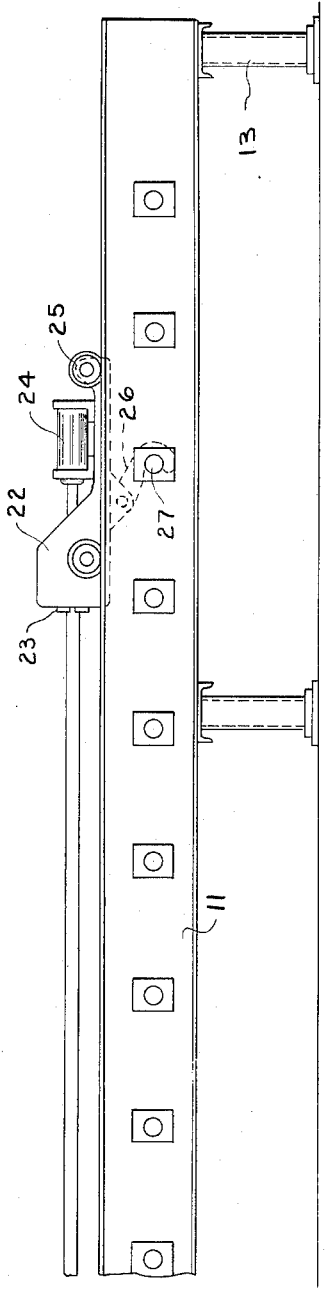
INVENTOR
MIRCEA A. GROSSU
BY Francis J. Klempay
ATTORNEY

INVENTOR
MIRCEA A. GROSSU

United States Patent Office 2,715,431
Patented Aug. 16, 1955

2,715,431

COMBINED TENSIONING AND TWISTING APPARATUS FOR STRAIGHTENING EXTRUDED SHAPES

Mircea A. Grossu, Youngstown, Ohio, assignor to Lombard Corporation, Youngstown, Ohio, a corporation of Ohio Application October 24, 1952, Serial No. 316,600

5 Claims. (Cl. 153—35)

The present invention relates to apparatus for use in the commercial production of elongated extruded sections, and more particularly to improvements in apparatus to be employed subsequent to the extruding operation proper for the purpose of straightening and aligning the extruded length to correct deformities which frequently occur in the extruded lengths during the formation thereof.

It is not uncommon during the extrusion of elongated metal shapes such as moldings and the like for the section to assume a slight twist which, while it may be slight in degree, may be quite noticeable over the entire length of the section. This deformity of course detracts substantially from the appearance of the product, making it commercially less desirable, and in the case of moldings and similar shapes may cause the product to be unusable or at least less desirable for use due to the difficulty of assembly. It has thus been a common practice in the extruding industry to provide equipment for ancillary use with extruding apparatus which functions to straighten and "detwist" the imperfect extruded lengths so that a premium commercial product may be obtained.

Prior practice in the construction and use of "detwisting" apparatus for the above purpose has shown that it is desirable to first place the extruded length under an extremely high tensional stress (for example, up to thirty tons) and to twist the section, while so stressed, in a direction opposite to the twist assumed during the extruding operation; the reverse twist being of a predetermined magnitude sufficient to permanently deform the extruded length an amount equal to the initial twist. A reverse twist of substantially less than a half revolution of one end of the extruded section with respect to its other end has been found to be sufficient for most commercial lengths and shapes.

The invention herein disclosed seeks to provide apparatus which will function generally in the manner of prior apparatus for the same purpose, but which will do so in a more efficient manner, and which may be constructed substantially more economically than such prior apparatus.

Thus, where in prior apparatus it has been common practice to employ a tensioning cylinder and a rotary stock gripping member which is mounted by means of a massive thrust bearing capable of withstanding the high tension forces applied to the extruded length, my invention teaches a construction wherein the heretofore required massive and expensive thrust bearing for mounting the stock gripping member is eliminated.

More particularly, my invention teaches a novel construction of apparatus of the above type wherein the tensioning cylinder itself functions additionally as a thrust bearing. The invention in this aspect contemplates providing a direct rigid connection between the rotary stock gripping member and one member of the tensioning cylinder whereby upon rotation of the stock gripping means the principal parts of the tensioning cylinder will rotate relative to each other upon a fluid thrust bearing consisting of the fluid forced into the cylinder for the purpose of placing an extruded length under tension. This arrangement, as will appear, not only eliminates the large thrust bearing heretofore thought to be required in such apparatus, but further operates to very substantially reduce the power required for rotating the stock gripping means under tension due primarily to the absence of any metal-to-metal contact in the direction of the applied tension.

Another object of the present invention is the provision of apparatus of the above character wherein hydraulic power may be used for the dual purpose of tensioning the extruded lengths and for subsequently causing twisting thereof in the manner desired. Thus, in prior apparatus, due in a large measure to the high frictional resistance to rotating the stock gripping means while simultaneously maintaining an extruded length under high tension, it has been common to provide a relatively large electric motor operating through suitable worm gear reducers whereby a high torque could be applied to the stock gripping means for the purpose of rotating the same. My invention, however, contemplates the use of a conventional hydraulic cylinder positioned transversely of and in offset relation to the rotary axis of the stock gripping means and connected thereto whereby upon suitable application of hydraulic fluid pressure to the cylinder the stock gripping means will be caused to rotate in the manner desired. This arrangement, which has heretofore been thought to be impractical because of the power requirements formerly involved, has the obvious advantage of simplifying the construction of the apparatus, and a further advantage of providing greater uniformity in the power and control system of the apparatus since hydraulic power must in any event be supplied to the tensioning cylinder, and it will be understood that this power is not otherwise utilized during rotation of the stock gripping means, the stock usually being under full tension at that time.

The above and other objects and advantages of the invention will become apparent upon full consideration of the following detailed specification and accompanying drawings wherein is illustrated a preferred embodiment of the invention.

Figure 3:
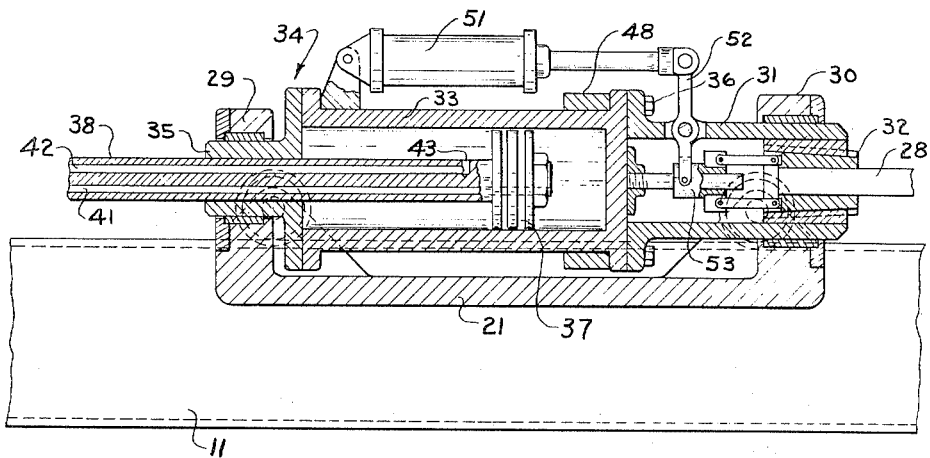

In the drawing:

Figure 1, shown in parts Figure 1A and Figure 1B, is a front elevation of apparatus embodying the teachings of my invention and used for the purpose of eliminating twist in lengthy extruded shapes;

Figure 2 is a section view taken generally along line II—II of Figure 1 illustrating certain features of my invention; and Figure 3 is a fragmentary section view taken along line III—III of Figure 2.

Referring now to the drawing, and initially to Figure 1 thereof, the reference numeral 10 designates an elongated base for the tensioning and twisting apparatus which may comprise spaced channel or I-beam members 11 arranged to form tracks for supporting one or more movable carriages to be hereafter described. The members 11 are mounted and supported in spaced relation to the floor level 12 by suitable legs 13.

Mounted on the base at the left-hand end thereof and in spaced above relation thereto is a conventional hydraulic supply circuit 14 comprising a supply tank 15, motor 16, pump 17 and inlet and outlet conduits 18 and 19 all supported above the base 10 by a platform 20.

Carried by the base 10 adjacent the hydraulic supply 14 is a carriage 21 which is movable longitudinally along the tracks or members 11. And in accordance with the principles of my invention the carriage 21 mounts combined apparatus 21', to be described, for both tensioning and twisting an extruded length engaged thereby.

Also carried by the base 10 and adapted for longitudinal movement therealong is a carriage 22 which is provided with stock gripping jaws 23 and an operating cylinder 24 therefor. As illustrated in Figure 1B, the carriage 22 is provided with wheels 25 for facilitating movement along the tracks 11, and is also provided with a hook 26 which is adapted to engage any one of a plurality of spaced transversely disposed bars 27 mounted in the base 10 whereby the carriage 22 may be rigidly retained against movement to the left along the base.

In the intended manner of operation of the illustrated apparatus an extruded stock piece 28 is gripped at each extreme end by the tensioning and twisting apparatus 21' and by the jaws 23, the carriage 22 being engaged through hook 26 to a suitable transverse bar 27 depending upon the length of the extruded stock piece 28. Upon the stock piece being so engaged, the same is placed under high tension by causing the apparatus 21' to move or tend to move in a direction away from the carriage 22. And upon such tension being applied in the required magnitude the apparatus 21' is caused to rotate in a direction opposite to the assumed twist of the stock 28 whereby the stock may be permanently deformed an amount equal or approximately equal to the initial deformation of the stock, the operation resulting in a commercially acceptable product as will be understood.

In accordance with the teachings of the invention the carriage 21 is provided with spaced upstanding bearing blocks 29 and 30 which are adapted to rotatably mount the combined tensioning and twisting apparatus 21' at each end thereof. The forward or right hand end of the apparatus 21' comprises a hollow generally cylindrical housing member 31 which engages on its outer surface with the bearing 30 and which houses interiorly a plurality of stock engaging grippers 32 which are arranged to slide longitudinally in the housing 31 and to simultaneously move in a gripping or releasing direction responsive to such longitudinal movement. In accordance with common practice, the grippers are preferably arranged to move in a gripping direction in response to longitudinal movement thereof to the right with respect to the housing 31 whereby the application of tension force to a stock piece 28 tends, if anything, to move the grippers 32 into tighter engagement with the stock piece.

As illustrated best in Figure 3, the left hand end of the apparatus 21 comprises the cylinder member 33 of a relatively large diameter, long stroke hydraulic actuator 34, the cylinder being provided in accordance with the teachings of the invention with an elongated neck portion 35 at its rod end which is adapted to engage with the bearing 29. The head end of the cylinder 33 is rigidly secured to the housing 31 by suitable bolts 36 or other means whereby to render the structure comprising the cylinder and housing rigid and suitably adapted for rotation as a unit in the axially aligned bearings 29 and 30.

Slidably received within the cylinder 33, in a conventional manner, is a piston 37 which is carried in rigidly connected relation to an elongated piston rod 38. In accordance with the principles of my invention, as applied to the embodiment thereof presently illustrated, the piston rod 38 extends a substantial distance outwardly of the cylinder 33 and is secured at its extreme outer end in rigid relation to the base 10; cross beam 39 and brackets 40 being utiilzed for this purpose.

For supplying hydraulic operating fluid to the cylinder 33 I have provided a pair of longitudinal bores 41 and 42 within the piston rod 38, one of which bores 41 communicates with the cylinder 33 on the right hand side of piston 37 while the other of the bores 42 communicates with the cylinder on the left hand side of piston 37 through an intersection radial bore 43. In the illustrated apparatus, bore 41 is in communication with the fluid source 14 through conduit 19, while bore 43 communicates with the source through conduit 18. It will be readily understood that direction of fluid under pressure through either one of the last-mentioned conduits 18 or 19 will cause the cylinder 33, and hence the combined apparatus 21' to move in an appropriate longitudinal direction along the tracks 11. The carriage 21 is of course adapted to move along with the combined apparatus 21' and suitable wheels 44 are provided on the carriage 21 for facilitating such movement.

For rotating the housing 31 and grippers 32, and thereby a stock piece 28 gripped therein, I have provided a hydraulic actuator 45 which is pivotally mounted at its head end by a bracket 46 depending downwardly from the carriage 21. The piston rod 47 of actuator 45 extends upwardly therefrom and is operatively connected to the cylinder 33 by means of a collar 48 having a suitable clevis 49 thereon. Suitable conduits, not shown, communicate between the actuator 45 and the source 14 through suitable control instrumentalities, also not shown, whereby at the appropriate time the actuator 45 may be energized to cause the cylinder 33 and housing 31 to rotate with respect to the carriage 21 in the manner desired. Usually it is desirable to employ suitable means such as a locking bolt 50 for releasably connecting the collar 48 to the cylinder 33 whereby the grippers 32 may be rotated to any desired initial orientation with respect to the carriage without necessitating movement of the piston rod 47.

Pivotally secured to the cylinder 33 on the upper side thereof is yet another hydraulic actuator 51 which is operatively connected through a pivoted lever 52 and sliding collar 53 to the gripper jaws 32 whereby upon energization of the actuator 51 the jaws may be caused to move into gripping or releasing relation with a stock piece 28 as will be understood.

The advantages of the invention should now be apparent. My apparatus of course possesses the principal obvious advantage of eliminating the heretofore required heavy-duty thrust bearing for rotatably mounting the stock twisting apparatus. And this is accomplished through a novel construction wherein the stock twisting apparatus is operatively combined with a tensioning cylinder so that the hydraulic fluid forced into the cylinder to place a stock piece under tension also functions with unusual effectiveness as a relatively frictionless thrust bearing. As will be readily understood from consideration of Figure 3 of the drawing all force applied to the apparatus for tensioning a stock piece gripped therein will be directed axially through the piston rod 38 and cylinder 33 to the stock piece. The carriage 21 carries no axial force load, as has been the prior practice, and may thus be constructed in an inexpensive manner.

A further advantage of my apparatus resides in the fact that my improved construction permits of the use of a conventional hydraulic actuator for rotating or twisting the stock while the same is under tension. In prior apparatus of which I am aware this arrangement was not practicable due to the unusually large frictional resistance to rotation inherent in the apparatus while under tension. Expensive electric motors and reduction gearing systems have thus been used almost universally prior to my invention. The latter arrangement, in addition to requiring a substantially higher initial cost necessitates the provision of both electrical and hydraulic control systems on the apparatus while it is generally preferred that a common system be provided throughout wherever possible.

It should be understood, however, that the embodiment of my invention herein illustrated and described in detail is merely illustrative, and reference should therefore be had to the appended claims in determining the true scope of the invention.

I claim:

1. In apparatus for straightening and aligning extruded stock and of the type comprising a base, means at one end of said base for gripping an extruded stock piece, means at the other end of said base for gripping said stock piece, means to apply tension to a stock piece so gripped and means to rotate one of said means to grip with respect to the other; the improvement in said one of said means comprising a carriage slidable on said base toward and away from said other of said means to grip, a housing rotatably carried by said carriage and having means therein adapted for gripping engagement with a stock piece, a hydraulic cylinder rigidly secured at its forward end to said housing in axially aligned relation thereto and rotatably supported in said carriage, a piston slidable in said cylinder, a piston rod connecting said piston and rigidly secured to said base, said piston rod extending rearwardly of said cylinder, a source of hydraulic fluid, conduit means communicating with said source and said cylinder on each side of said piston whereby said cylinder may be caused to move axially with respect to said piston upon application of fluid pressure in said cylinder, and means to rotate said cylinder and housing with respect to said carriage and piston rod.

2. Apparatus according to claim 1 further characterized in that said means to rotate comprises a fluid cylinder connecting said carriage and said cylinder in spaced relation to the axis of said cylinder and disposed transversely thereto.

3. In combined apparatus for applying torsional and tensional forces to a stock piece the combination of a base, a carriage supported on said base and having spaced forward and rear journals therein, a fluid cylinder rotatably supported in the rearward one of said journals, a housing rotatably supported in the forward one of said journals, said housing being rigidly secured to said cylinder in axially aligned relation thereto, stock engaging grippers carried in said housing, a piston and piston rod for said cylinder, said piston rod extending rearwardly of said cylinder and having its rearward end fixed to said base, means to supply fluid under pressure to said cylinder to cause said cylinder to move axially along said fixed piston rod, and means to rotate said cylinder about said piston rod.

4. Apparatus according to claim 3 further characterized by said means to supply comprising a source of fluid under pressure and a pair of fluid passages in said piston rod, said passages communicating with said cylinder on opposite sides of said piston.

5. Apparatus according to claim 3 further characterized in that said means to rotate comprises a second fluid cylinder positioned transversely of and in offset relation to said gripping means and adapted upon energization to rotate said gripping means through a portion of a complete revolution, said means to rotate further including an adjustable member whereby the normal orientation of said gripping means with respect to said second fluid cylinder may be adjusted.

References Cited in the file of this patent

UNITED STATES PATENTS

| | | |
|---|---|---|
| 2,136,538 | Borwick | Nov. 15, 1938 |
| 2,352,442 | Loewy et al. | June 27, 1944 |
| 2,487,972 | Katz | Nov. 15, 1949 |
| 2,487,973 | Kent | Nov. 15, 1949 |
| 2,533,025 | Martin | Dec. 5, 1950 |
| 2,635,669 | Worthington | Apr. 21, 1953 |